(12) United States Patent
Kita et al.

(10) Patent No.: US 7,847,828 B2
(45) Date of Patent: Dec. 7, 2010

(54) IMAGE CAPTURING APPARATUS HAVING A MOVING IMAGE CAPTURE FUNCTION, AND PROGRAM AND METHOD FOR CONTROLLING SAME

(75) Inventors: Kazunori Kita, Nishitama-gun (JP); Masami Yuyama, Ome (JP); Akihiro Tsukamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 404 days.

(21) Appl. No.: 11/901,207

(22) Filed: Sep. 14, 2007

(65) Prior Publication Data

US 2008/0088747 A1    Apr. 17, 2008

(30) Foreign Application Priority Data

Sep. 15, 2006  (JP) ............................. 2006-250678
Feb. 9, 2007   (JP) ............................. 2007-029885

(51) Int. Cl.
    *H04N 5/225* (2006.01)
(52) U.S. Cl. .................................................. 348/220.1
(58) Field of Classification Search .............. 348/220.1, 348/222.1
    See application file for complete search history.

(56) References Cited

U.S. PATENT DOCUMENTS

| 7,092,023 B2 * | 8/2006 | Hayashi ................. 348/333.05 |
| 7,414,658 B2 * | 8/2008 | Ariga .................... 348/333.11 |
| 2003/0146981 A1 | 8/2003 | Bean et al. | |
| 2004/0033051 A1 | 2/2004 | Ip | |
| 2005/0052553 A1 | 3/2005 | Kido et al. | |
| 2006/0282867 A1 * | 12/2006 | Mizuhashi et al. .......... 725/105 |
| 2006/0285831 A1 | 12/2006 | Tanaka | |

FOREIGN PATENT DOCUMENTS

| JP | 6-22320 A | 1/1994 |
| JP | 2004-193981 A | 7/2004 |
| JP | 2005-086499 A | 3/2005 |

OTHER PUBLICATIONS

Notification of Transmittal of the International Search Report and the Written Opinion of the International Searching Authority dated Jan. 22, 2008 for PCT/JP2007/067691. 13 sheets.
Korean Office Action dated Jul. 26, 2010 and English translation thereof, issued in counterpart Korean Application No. Oct. 2009-7000304.

* cited by examiner

*Primary Examiner*—Lin Ye
*Assistant Examiner*—Amy Hsu
(74) *Attorney, Agent, or Firm*—Holtz, Holtz, Goodman & Chick, PC

(57) ABSTRACT

An image capturing apparatus comprises an image capturing unit, a first storage unit configured to store sample images and corresponding image capture frame rates, a display unit configured to display the sample images stored in the first storage unit at a predetermined frame rate, a detecting unit configured to detect a confirmation signal indicating an image capture frame rate corresponding to a sample image selected from the sample images, a driving unit configured to drive the image capturing unit at the image capture frame rate indicated by the confirmation signal, and a second storage unit configured to store image data captured by the image capturing unit.

11 Claims, 15 Drawing Sheets

FIG.2

| SAMPLE MOVING IMAGE DATA | IMAGE CAPTURE AND REPRODUCTION CONDITIONS | | OTHER IMAGE CAPTURE CONDITIONS AND CORRECTION CONDITIONS | | | | | | | | |
|---|---|---|---|---|---|---|---|---|---|---|---|
| | IMAGE CAPTURE FRAME RATE | REPRODUCTION FRAME RATE | IMAGE SIZE | FLASH | WHITE BALANCE | ISO SPEED | PHOTOMETRIC METHOD | AF AREA | FILTER | COLOR ENHANCEMENT | COLOR SATURATION | SHARPNESS | ... |
| MOVING IMAGE A (IMAGE OF WALKING PERSON) | | | | | | | | | | | | |
| MOVING IMAGE B (IMAGE OF TRAVELING AUTOMOBILE) | 360 (fps) | 60 (fps) | VGA | VIDEO LIGHT | AUTOMATIC | HIGH SPEED (PIXEL ADDITION) | CENTER-WEIGHTED METERING | MACRO | OFF | OFF | STANDARD | CRISP | ... |
| MOVING IMAGE C (IMAGE OF FALLING OBJECT) | | | | | | | | | | | | |
| EXPLANATORY INFORMATION | HIGH SPEED IMAGE CAPTURE WILL BE PERFORMED; IT IS SUITABLE FOR SHOOTING A FALLING OBJECT OR GOLF SWING. | | | | | | | | | | | |

| SAMPLE MOVING IMAGE DATA | IMAGE CAPTURE AND REPRODUCTION CONDITIONS | | | OTHER IMAGE CAPTURE CONDITIONS AND CORRECTION CONDITIONS | | | | | | | | |
|---|---|---|---|---|---|---|---|---|---|---|---|---|
| | IMAGE CAPTURE FRAME RATE | REPRODUCTION FRAME RATE | IMAGE SIZE | FLASH | WHITE BALANCE | ISO SPEED | PHOTOMETRIC METHOD | AF AREA | FILTER | COLOR ENHANCEMENT | COLOR SATURATION | SHARPNESS | ... |
| MOVING IMAGE A (IMAGE OF WALKING PERSON) | | | | | | | | | | | | |
| MOVING IMAGE B (IMAGE OF TRAVELING AUTOMOBILE) | 240 (fps) | 60 (fps) | VGA | VIDEO LIGHT | AUTOMATIC | HIGH SPEED (PIXEL ADDITION) | CENTER-WEIGHTED METERING | MACRO | OFF | OFF | STANDARD | CRISP |
| MOVING IMAGE C (IMAGE OF FALLING OBJECT) | | | | | | | | | | | | |
| EXPLANATORY INFORMATION | MEDIUM SPEED IMAGE CAPTURE WILL BE PERFORMED; IT IS SUITABLE FOR SHOOTING A TRAVELING AUTOMOBILE. | | | | | | | | | | | |

| SAMPLE MOVING IMAGE DATA | EXPLANATORY INFORMATION | IMAGE CAPTURE AND REPRODUCTION CONDITIONS | | | OTHER IMAGE CAPTURE CONDITIONS AND CORRECTION CONDITIONS | | | | | | | | |
|---|---|---|---|---|---|---|---|---|---|---|---|---|---|
| | | IMAGE CAPTURE FRAME RATE | REPRODUCTION FRAME RATE | IMAGE SIZE | FLASH | WHITE BALANCE | ISO SPEED | PHOTOMETRIC METHOD | AF AREA | FILTER | COLOR ENHANCEMENT | COLOR SATURATION | SHARPNESS |
| MOVING IMAGE A (IMAGE OF WALKING PERSON) (HIGH-SPEED IMAGE CAPTURE) | HIGH SPEED IMAGE CAPTURE WILL BE PERFORMED; IT IS SUITABLE FOR SHOOTING A FALLING OBJECT OR GOLF SWING. | 360 (fps) | 60 (fps) | VGA | VIDEO LIGHT | AUTOMATIC | HIGH SPEED (PIXEL ADDITION) | CENTER-WEIGHTED METERING | MACRO | OFF | OFF | STANDARD | CRISP | ... |
| MOVING IMAGE B (IMAGE OF WALKING PERSON) (MEDIUM-SPEED IMAGE CAPTURE) | MEDIUM SPEED IMAGE CAPTURE WILL BE PERFORMED; IT IS SUITABLE FOR SHOOTING A TRAVELING AUTOMOBILE. | 240 (fps) | 60 (fps) | VGA | VIDEO LIGHT | AUTOMATIC | HIGH SPEED (PIXEL ADDITION) | CENTER-WEIGHTED METERING | MACRO | OFF | OFF | STANDARD | CRISP | ... |
| MOVING IMAGE C (IMAGE OF WALKING PERSON) (LOW-SPEED IMAGE CAPTURE) | LOW SPEED IMAGE CAPTURE WILL BE PERFORMED; IT IS SUITABLE FOR SHOOTING A WALKING PERSON. | 120 (fps) | 60 (fps) | VGA | VIDEO LIGHT | AUTOMATIC | HIGH SPEED (PIXEL ADDITION) | CENTER-WEIGHTED METERING | MACRO | OFF | OFF | STANDARD | CRISP | ... |

IMAGE CAPTURING APPARATUS HAVING A MOVING IMAGE CAPTURE FUNCTION, AND PROGRAM AND METHOD FOR CONTROLLING SAME

CROSS-REFERENCE TO RELATED APPLICATIONS

This application is based upon and claims the benefit of priority from prior Japanese Patent Applications No. 2006-250678, filed Sep. 15, 2006, and No. 2007-029885, filed Feb. 9, 2007, the entire contents of both of which are incorporated herein by reference.

BACKGROUND OF THE INVENTION

1. Field of the Invention

The present invention relates to an image capturing apparatus provided with a moving image capture function, a controlling program for the image capturing apparatus and a controlling method for the image capturing apparatus.

2. Description of the Related Art

A conventional high-speed camera apparatus is capable of high speed capturing of an image of a rapidly moving object so that the captured image can be reproduced in slow motion with high definition. For example, Jpn. Pat. Appln. KOKAI Publication No. 06-22320, discloses a high-speed camera apparatus provided with first, second and third image sensors. The high-speed camera apparatus can capture images of a rapidly moving spherical object at short time intervals (frame rate), by sequentially and cyclically operating the first, second and third image sensors.

The above high-speed camera apparatus is capable of high-speed continuous image capture at a high frame rate; however, it is difficult to determine a preferable frame rate which corresponds to the moving velocity of the object. Therefore, when the high-speed camera apparatus captures a continuous image of a slowly moving object at a high frame rate, a large amount of image data, which is does not need to be stored, is generated, resulting in a shortage of memory. On the other hand, when the high-speed camera apparatus captures a continuous image of an object which is moving at velocity higher than the frame rate, an obscure image is stored.

BRIEF SUMMARY OF THE INVENTION

According to an embodiment of the present invention, an image capturing apparatus comprises:

an image capturing unit;

a first storage unit configured to store sample images and corresponding image capture frame rates;

a display unit configured to display the sample images stored in the first storage unit at a predetermined frame rate;

a detecting unit configured to detect a confirmation signal indicating an image capture frame rate corresponding to a sample image selected from the sample images;

a driving unit configured to drive the image capturing unit at the image capture frame rate indicated by the confirmation signal; and a second storage unit configured to store image data captured by the image capturing unit.

According to another embodiment of the present invention, a computer readable medium for storing program product for use with an image capturing apparatus including an image capturing unit, a first storage unit configured to store sample images and corresponding image capture frame rates, and a second storage unit configured to store image data captured by the image capturing unit, the program product comprises:

first computer readable program means for displaying the sample images stored in the first storage unit at a predetermined frame rate;

second computer readable program means for detecting a confirmation signal indicating an image capture frame rate corresponding to a sample image selected from the sample images; and third computer readable program means for driving the image capturing unit at the image capture frame rate indicated by the confirmation signal.

According to another embodiment of the present invention, an image capturing method which is used for an image capturing apparatus including an image capturing unit, a first storage unit configured to store sample images and corresponding image capture frame rates, and a second storage unit configured to store image data captured by the image capturing unit, the method comprises:

displaying the sample images stored in the first storage unit at a predetermined frame rate;

detecting a confirmation signal indicating an image capture frame rate corresponding to a sample image selected from the sample images; and driving the image capturing unit at the image capture frame rate indicated by the confirmation signal.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention, in which:

FIG. 2 is a conceptual diagram showing a configuration of the first moving image table included in the digital camera of FIG. 1;

FIG. 3 is a conceptual diagram showing a configuration of the second moving image table;

FIG. 11 is a conceptual diagram showing a configuration of a moving image table according to the second embodiment;

DETAILED DESCRIPTION OF THE INVENTION

First Embodiment

Figure 1:
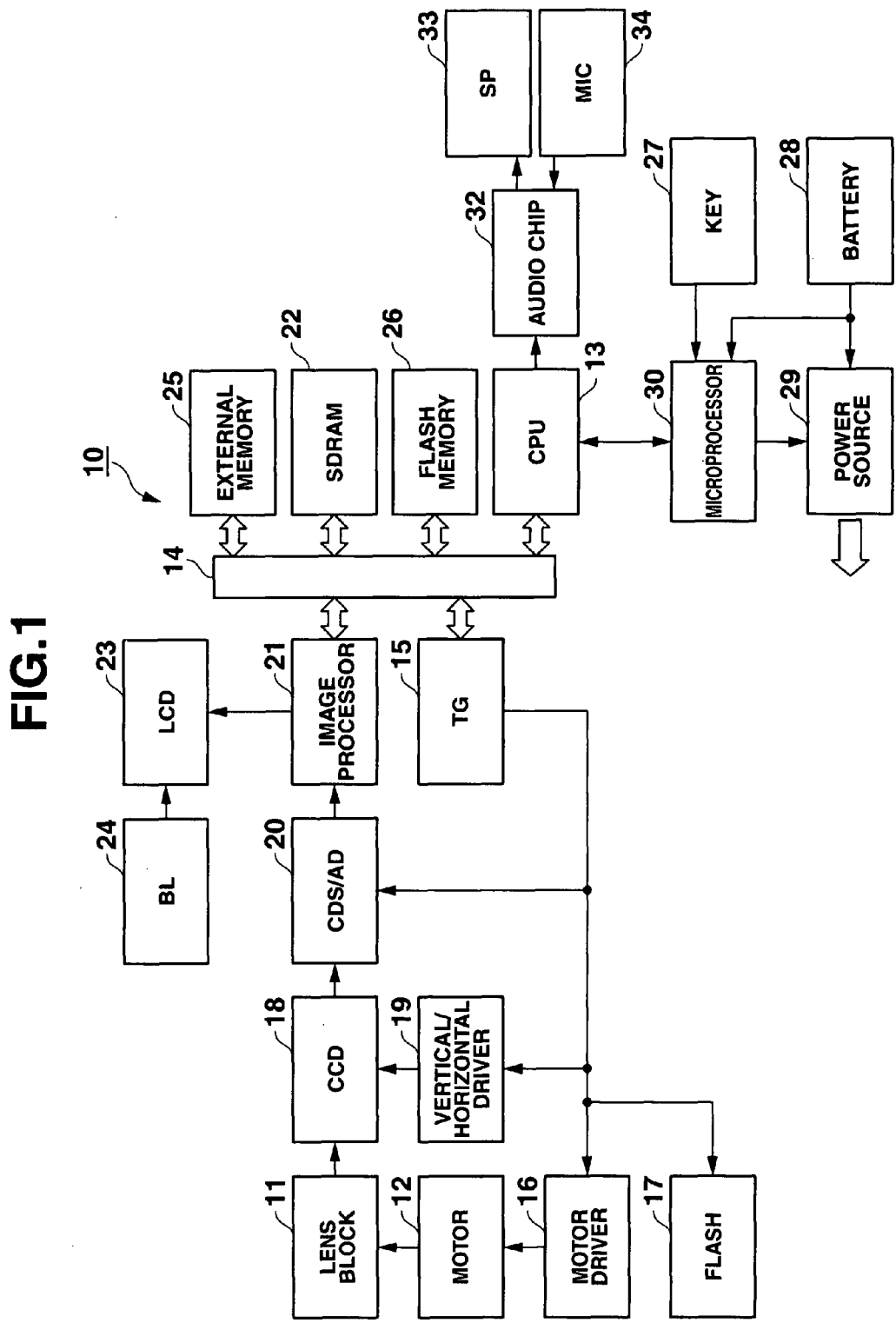
FIG. 1 is a block diagram showing an electric configuration of a digital camera 10 according to a first embodiment of the present invention.

An embodiment according to the present invention will be explained below with reference to the drawings. FIG. 1 is a block diagram showing circuitry of a digital camera 10 according to the present embodiment. The digital camera 10 is provided with a still image capture function and a moving image capture function. The digital camera 10 has a function of capturing a moving image at different frame rates of 60 frames/second, 120 frames/second, 240 frames/second, 360 frames/second, and the like.

The digital camera 10 comprises a lens block 11. The lens block 11 includes an optical system including a zoom lens and a focus lens. The optical system is driven along the optical axis by a motor 12 arranged in a drive system.

The CPU 13 controls the overall operation of the digital camera 10. A motor driver 16, a flash 17, vertical/horizontal driver 19 and a unit circuit 20 are connected to the CPU 13 via a bus 14 and a timing generator (TG) 15. The motor driver 16 drives the motor 12 in response to a timing signal generated by the timing generator 15 under control of the CPU 13. The flash 17 is driven in response to the timing signal generated by the timing generator 15. The vertical/horizontal driver 19 drives a CCD 18 in response to the timing signal generated by the timing generator 15 under the control of the CPU 13. The unit circuit (preprocessor) 20 includes a CDS (correlated double sampling) circuit and an analog-to-digital (A/D) converter, and is driven in response to the timing signal generated by the timing generator 15. The CDS circuit removes noise contained in an output signal sent from the CCD 18 by way of correlated double sampling. The A/D converter converts the noise-removed image signal into a digital signal. The unit circuit 20 outputs the digitized image signal to the image processor 21.

The digital camera 10 includes the CCD 18 as an image sensor. The CCD 18 is arranged perpendicular to the optical axis of the lens block 11. An optical image of an object is formed by the lens block 11 on the light receiving surface of the CCD 18. The CCD 18 outputs an analog image signal based on the optical image of the object to the unit circuit 20 according to the timing signal output by the vertical/horizontal driver 19.

The image processor 21 performs processing such as pedestal clamp processing on the input image signal so as to convert the image signal into a luminance (Y) signal and a color difference (UV) signal. The image processor 21 performs digital signal processing such as auto-white balance, edge enhancement and pixel interpolation. The YUV data converted by the image processor 21 is sequentially stored in a synchronous dynamic random access memory (SDRAM) 22. In a recording (REC) mode, every time a frame of image data is stored, the image data is converted into a video signal and the video signal is sent to a liquid crystal display (LCD) monitor 23 and displayed as a through image. The LCD monitor 23 is provided with a back light (BL) 24.

When the operation of a shutter key is detected as a trigger, the processing of the digital camera 10 switches from display of the through image to storing of a still image. In more detail, the CPU 13 controls the CCD 18, the vertical/horizontal driver 19, the unit circuit 20 and the image processor 21 in order to store a still image. The stored still image data is temporarily stored in the SDRAM 22, compressed and coded, and finally stored in an external memory 25 as a still image file in a predetermined format such as JPEG or the like.

In the moving image capture mode, when first and second operations of the shutter key are detected as instructions to start and stop capturing a moving image, respectively, the digital camera 10 sequentially stores frames of image data captured between the first and second operations of the shutter key in the SDRAM 22. The digital camera 10 compresses and codes the frames of image data and stores the image data in the external memory 25 as a moving image file.

In a play-back mode, the still image file and/or the moving image file stored in the external memory 25 are read out in response to a selection operation by a user, and the selected file is decompressed and expanded in the SDRAM 22 as YUV data and reproduced on the LCD monitor 23.

A flash memory 26 stores various programs for causing the CPU 13 to control each of the above components, such as AE, AF and AWB controlling programs and programs for causing the CPU 13 to function as a controller, a display controller, a selecting unit, and a setting unit according to the present embodiment.

The digital camera 10 further includes a key input unit 27, a rechargeable battery 28 such as a nickel-metal-hydride battery, a power source controlling circuit 29 for supplying the power of the battery 28 for the above components, and a microprocessor 30 for controlling the above components. The key input unit 27 includes a power switch, a mode selecting key, the shutter key, a zoom key, a plus key, a minus key, a menu key and other operational keys and switches. The microprocessor 30 constantly detects whether any of the operational keys in the key input unit 27 has been operated. When the user operates any operational key, the microprocessor 30 sends an operational signal corresponding to the operation to the CPU 13.

In addition, the digital camera 10 is provided with an audio recording function. A speaker (SP) 33 and a microphone (MIC) 34 are connected to the CPU 13 via an audio processing circuit 32. In the moving image capture mode, the audio processing circuit 32 performs waveform processing on an audio input sent from the microphone 34 and inputs the processed audio waveform data to the CPU 13. The CPU 13 compresses and codes the audio waveform data input from the microphone 34 and the audio processing circuit 32 during a period between a detection of the first operation of the shutter key and a detection of the second operation of the shutter key, in the moving image capture mode. The CPU 13 generates an audio-added moving image file including the above compressed audio waveform data and the frames of image data captured during the period between the detection of the first operation of the shutter key and the detection of the second operation of the shutter key and sequentially compressed and coded, and stores the audio-added moving image file in the external memory 25. In the play-back mode, the audio-added moving image file stored in the external memory 25 may be reproduced in such a manner that while the moving image data contained in the above image file is being reproduced, the audio processing circuit 32 processes the audio waveform data contained in the audio-added moving image file and drives the speaker 33 to output the audio waveform data.

The flash memory 26 stores first to N-th moving image tables and first to M-th composite image tables together with the aforementioned various programs. FIG. 2 shows data contents of a first moving image table 261 corresponding to high-speed image capture, and FIG. 3 shows data contents of a second moving image table 262 for medium-speed image capture. Each of the moving image tables stores "sample moving image data," "explanatory information," "image capture and reproduction conditions," and "other image capture conditions and correction conditions."

In more detail, each of the moving image tables stores sample moving images A, B and C. The sample moving images A, B and C, are moving images representative of scenes in which different objects are captured at different angles of view. The sample moving image A is an image of a walking person generated by capturing a scene in which a person is walking. The sample moving image B is an image of a traveling automobile generated by capturing a scene in which an automobile is traveling. The sample moving image C is an image of a falling object generated by capturing a scene in which an object is falling. Data about an image capture frame rate (frames per second [fps]), an image reproduction frame rate (fps) and an image size is stored as "image capture and reproduction conditions." Setting data about a flash, white balance, an ISO speed and a photometric method, an AF area, a filter, color enhancement, color saturation, sharpness and the like is stored as "other image capture conditions and correction conditions."

That is, according to the present embodiment, not only image capture conditions but also image reproduction conditions are stored in the moving image tables. Therefore, not only setting of an image capture frame rate, which will be described later, but also setting of an image reproduction frame rate may be performed only by means of the data stored in the moving image table.

All of the sample moving images A to C stored in the first moving image table 261 are data of moving images captured at an image capture frame rate of 360 fps. The first moving image table 261 stores 360 fps as the image capture frame rate and stores text data such as "High speed image capture will be performed, it is suitable for shooting a falling object or golf swing." as the explanatory information.

The sample moving images A to C stored in the second moving image table 262 and the sample moving images A to C stored in the first moving image table 261 are obtained by capturing the same objects. However, the image capture frame rates are different, and all of the sample moving images A to C stored in the second moving image table 262 are data of moving images captured at an image capture frame rate of 240 fps. The second moving image table 262 stores 240 fps as the image capture frame rate and stores text data such as "Medium speed image capture will be performed, it is suitable for shooting a traveling automobile." as the explanatory information.

The flash memory 26 also stores other moving image tables not shown in the drawings, including a third moving image table corresponding to low-speed image capture. Each of the remaining moving image tables stores sample moving images A to C obtained by capturing the same objects as the sample moving images A to C stored in the first and second moving image tables 261 and 262. The sample moving images A to C of the same moving image table are captured at the same predetermined image capture frame rate (note that respective moving image tables correspond to different image capture frame rates). Each moving image table stores explanatory information corresponding to the image capture frame rate.

Moreover, all the moving image tables store 60 fps as an image reproduction frame rate.

Figure 4:
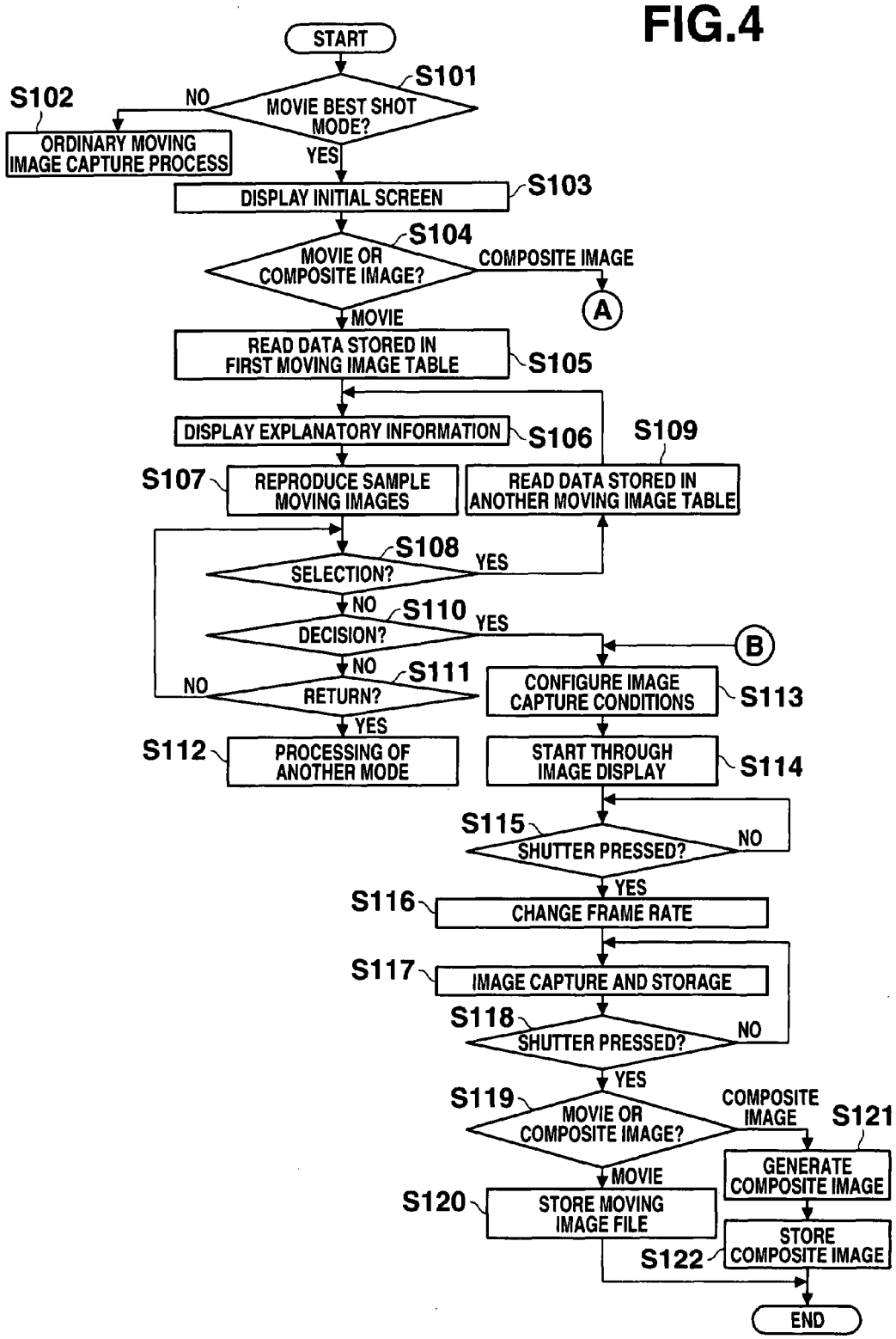
FIG. 4 is a flowchart of a process according to the first embodiment.

In the present embodiment according to the above configuration, when a user sets the moving image capture mode, the CPU 13 executes processing indicated in the flowchart of FIG. 4 based on a program stored in the flash memory 26.

Firstly, the CPU 13 determines whether or not a movie-best-shot mode is set by the user through the key input unit 27 (step S101). When the CPU 13 determines that the movie-best-shot mode is not set ("NO" in step S101), the CPU 13 executes an ordinary moving image capture processing (step S102).

Figure 6A:
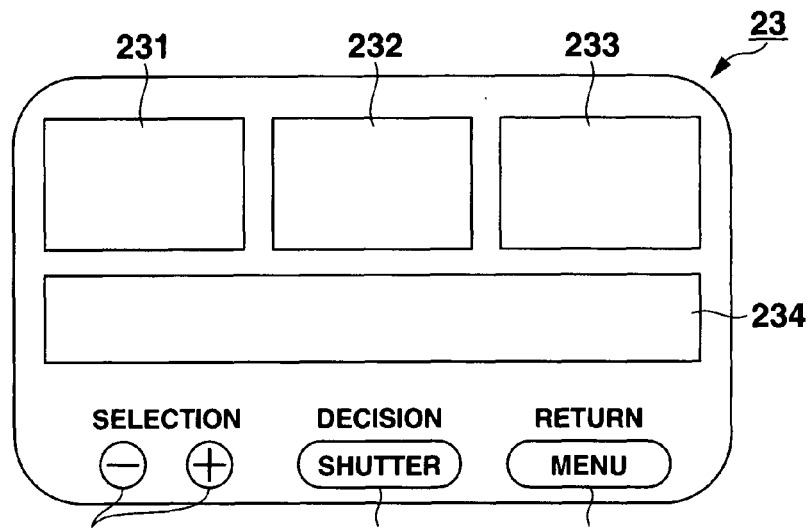
FIGS. 6A, 6B and 6C are diagrams showing display transition according to the first embodiment.

When the CPU 13 determines that the movie-best-shot mode is set by the user ("YES" in step S101), the CPU 13 displays an initial screen on the LCD monitor 23 (step S103). The initial screen includes, as illustrated in FIG. 6A, first to third image display areas 231 to 233, an explanation display area 234, and button indicators 235 to 237 for "selection", "decision" and "return". When the user intends to enter an instruction of "selection", "decision" or "return" (to be described later), the user operates a button of input unit 27 indicated by the corresponding button indicator.

The movie-best-shot mode according to the present embodiment includes a movie capture mode and a composite image capture mode. In the following explanation, the operation performed when the movie capture mode is set is described first.

Figure 6B:
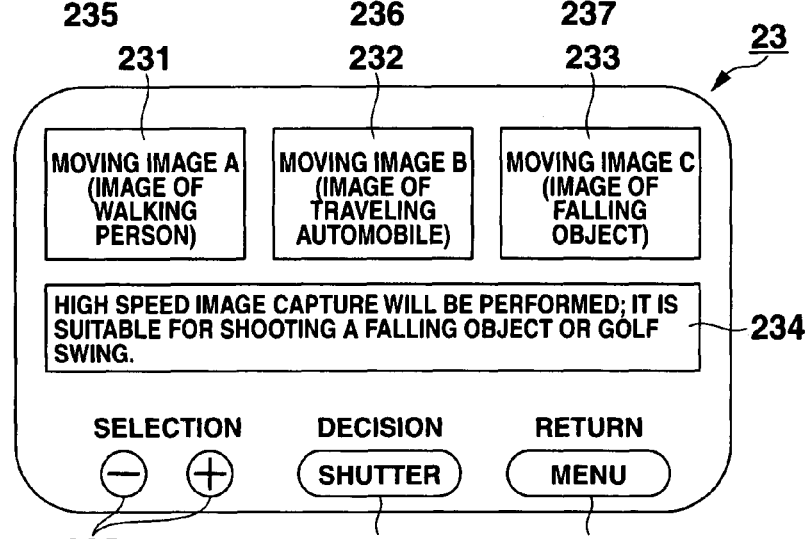

The CPU 13 determines which of the movie capture mode (moving image capture mode) and the composite image capture mode is set by the user (step S104). When the CPU 13 determines that the movie capture mode is set, the CPU 13 reads the data stored in the first moving image table 261 from the flash memory 26 (step S105). The CPU 13 displays the explanatory information read from the first moving image table 261 in the explanation display area 234 (step S106); accordingly, the explanatory information "High speed image capture will be performed, it is suitable for shooting a falling object or golf swing." appears in the explanation display area 234, as indicated in FIG. 6B.

Subsequently, the CPU 13 simultaneously reproduces the sample moving images A, B and C stored in the first moving image table 261 and displays the sample moving images A, B and C respectively in the first to third image display areas 231 to 233 (step S107). Taking FIG. 6B as an example, the CPU 13 reproduces the respective sample moving images A, B and C and displays the sample moving image A of a walking person in the first image display area 231, the sample moving image B of a traveling automobile in the second image display area 232 and the sample moving image C of a falling object in the third image display area 233. That is, the first image display area 231 displays the sample moving image A of an object moving within the image display area at lower speed than objects displayed in other image display areas 232 and 233. The third image display area 233 displays the sample moving image C of an object moving within the image display area at higher speed than objects displayed in other image display areas 231 and 232. The second image display area 232 displays the sample moving image B of an object moving within the image display area at medium speed (between the speeds of the objects displayed in the image display areas 231 and 233).

The sample moving images A, B and C are reproduced at the image reproduction frame rate of 60 fps stored in the first moving image table 261. All of the sample moving images A, B and C are reproduced in slow motion at one-sixth speed, since all of the sample moving images A, B and C are captured at the image capture frame rate of 360 fps.

The sample moving images A, B and C contain objects differing in moving speed. The sample moving image A is an image of a walking person in which a slowly moving object is captured. The sample moving image B is an image of a traveling automobile in which an object moving at medium speed is captured. The sample moving image C is an image of a falling object in which a rapidly moving object is captured.

Therefore, the user may recognize how the sample moving images are reproduced in slow motion at the reproduction frame rate of 60 fps, when the sample moving images indicate objects moving at different speeds and captured at the same image capture frame rate of 360 fps. By considering of the moving speed of a desired object, the user can easily determine whether or not it is appropriate to shoot the desired object at the same frame rate (360 fps) as the sample moving images currently being played back.

It should be noted that because the moving speed of an object in the display screen is expressed by a unit dot/s, even though an object may be moving at one (same) speed, the moving speed in the display screen (expressed by dot/s) varies depending on zoom ratios for image capture and relative distances between the digital camera and the moving objects. However, the user can intuitively understand the relationship between the image capture frame rate and the angle of view or composition by viewing the sample moving images A, B and C.

Furthermore, by referring to the displayed explanatory information, the user can easily determine whether or not it is appropriate to shoot the desired object at the same frame rate as the sample moving images currently being played back. Namely, the features illustrated in FIG. 6B, for example, facilitate making the determination of whether or not the moving speed of the desired object in an image display area will be preferable, when the moving image of the desired object is reproduced in slow motion at one-sixth speed.

When the user takes the moving speed of the desired object into consideration and determines that it is not appropriate to capture images at the same image capture frame rate as the sample moving images being displayed, the user may enter a "selection" instruction by operating the minus key or the plus key of the key input unit 27. The CPU 13 determines whether or not the "selection" instruction is detected (step S108). When the CPU 13 determines that the "selection" instruction is detected ("YES" in step S108), the CPU 13 reads stored data from another moving image table (step S109). Then, the CPU 13 repeats processing of step S106 and thereafter.

Figure 6C:
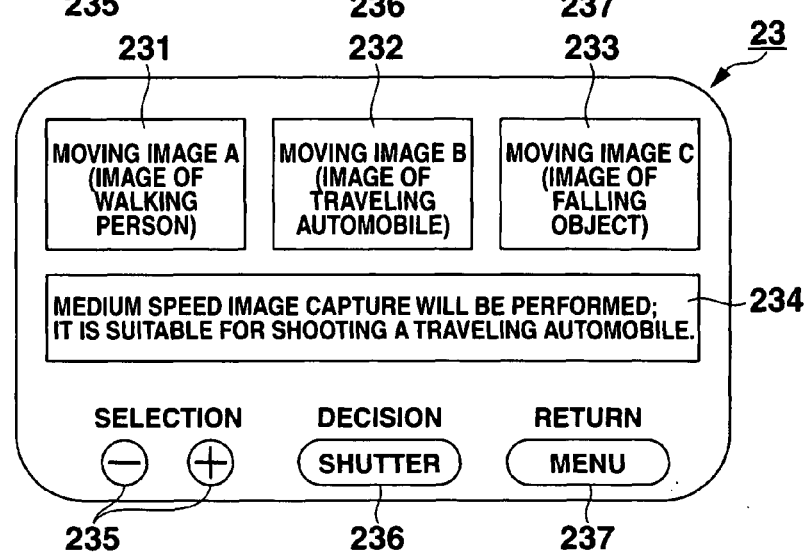

For example, when the second moving image table 262 is read out in step S109, as shown in FIG. 6C the explanatory information displayed in the explanation display area 234 in step S106 is "Medium speed image capture will be performed, it is suitable for shooting a traveling automobile." In addition, the CPU 13 displays the sample moving image A of a walking person in the first image display area 231, the sample moving image B of a traveling automobile in the second image display area 232 and the sample moving image C of a falling object in the third image display area 233 by the processing in step S107, as indicated in FIG. 6C.

The CPU 13 reproduces the sample moving images A, B and C at the image reproduction frame rate of 60 fps which is stored in the second moving image table 262. The image capture frame rates for all the sample moving images A, B and C are the same rate of 240 fps. Thus, the all of the sample moving images A, B and C are reproduced at one-fourth speed. The user may thereby recognize how the sample moving images, which indicate objects moving at different speeds and captured at the same image capture frame rate of 240 fps, are reproduced in slow motion at the reproduction frame rate of 60 fps. Considering the moving speed of a desired object, the user can easily determine whether or not it is appropriate to shoot the desired object at the same frame rate (240 fps) as the sample moving images currently being played back. Namely, the features illustrated in FIG. 6B, for example, facilitate making the determination of whether or not the moving speed of the desired object in an image display area will be preferable when the moving image of the desired object is reproduced and displayed in slow motion at one-fourth speed.

According to the present embodiment, by comparing the display screens switched based on the moving image tables, the user can clearly understand how the captured image will be reproduced.

On the other hand, when the CPU 13 determines in step S108 that the "selection" instruction is not detected, the CPU 13 determines whether or not "decision" is instructed by depression of the shutter key (step S110). When the CPU 13 determines that "decision" is not instructed ("NO" in step S110), the CPU 13 determines whether or not "return" is instructed by operation of the menu key (step S111). When the CPU 13 determines that "return" is not instructed ("NO" in step S111), the CPU 13 repeats the processing of step S108 and thereafter. When the CPU 13 determines that the "return" instruction is made ("YES" in step S111), the CPU 13 executes a processing of another mode (step S112).

After comparing the moving speed of the object with the reproduced sample moving images A to C, when the user determines that it is appropriate to shoot the object at the same image capture frame rate as the sample moving images, the user presses the shutter key down to instruct "decision". Consequently, the determination result of step S110 comes to be "YES", and the CPU 13 executes the processing of step S113 to set the image capture conditions.

More specifically, the CPU 13 retrieves the "image capture conditions" and the "other image capture conditions and correction conditions" stored in the moving image table corresponding to the sample moving images, which are read out in step S105 or step S109 and are being reproduced at the time when the "decision" instruction is made. The CPU 13 configures and controls the corresponding components of the digital camera 10 based on the retrieved image capture conditions and the like (step S113).

Then, the CPU 13 starts display of a through image (step S114). The CPU 13 causes the CCD 18 to output image data at a predetermined standard frame rate (60 fps, for example), and displays the through image on the LCD monitor 23 on the basis of the output image data. The CPU 13 waits for the first press of the shutter key (step S115). While the CPU 13 is waiting, the user refers to the through image displayed on the LCD monitor 23 and adjusts the angle of view of the digital camera 10. Thereafter, the user presses the shutter key down to start image capture. When the first press of the shutter key is performed ("YES" in step S115), the CPU 13 changes the image capture frame rate of the CCD 18 from the aforementioned standard frame rate to the image capture frame rate configured in step S113 (step S116).

The image capture frame rate stored in the first moving image table 261 is 360 fps, for instance. Accordingly, if "decision" is instructed in the case where the sample moving images A to C stored in the first moving image table 261 are being reproduced, at step S116 the CPU 13 changes the image capture frame rate from the standard image capture frame rate of 60 fps to the image capture frame rate of 360 fps. Accordingly, the image data is output from the CCD 18 at the frame rate of 360 fps. The CPU 13 sequentially stores the image data output at the image capture frame rate changed in step S116 into the SDRAM 22 (step S117).

In the present embodiment, after displaying the image data output at the standard frame rate as the through image, the CPU 13 changes the image capture frame rate in response to the press of the shutter key. However, the CPU 13 may capture the through image at the image capture frame rate configured in step S113, instead of waiting for the press of the shutter key to change frame rate.

The CPU 13 determines whether or not the second press of the shutter key is performed (step S118). The CPU 13 repeats the processing of step S117 until the second press of the shutter is performed. That is, in the case in which the image capture frame rate is set to 360 fps, the CPU 13 sequentially stores frames of image data sequentially captured at 360 fps in the SDRAM 22.

When the user presses the shutter key down for the second time to terminate capturing of the moving image, the determination result in step S118 becomes "YES". Then, the flow proceeds to step S119, where the CPU 13 determines which of the movie capture mode and the composite image capture mode was set by the user in step S104 (step S119). When the movie capture mode is set, the CPU 13 creates a moving image file from the frames of image data stored in the SDRAM 22 and names the file to store the named file in the external memory 25 (step S120).

After performing the "decision" operation, the user merely operates the shutter key to instruct the start and termination of capturing a moving image; therefore, capturing a moving image can readily be performed at a suitable desired frame rate.

The CPU 13 adds the reproduction frame rate, which is stored as the "reproduction condition" in the moving image table, to the moving image file as header information when creating and storing the moving image file in step S120. Hence, at the time of reproducing the moving image file, it is possible to reproduce the moving image file at the same reproduction frame rate as the sample moving images which are referred to and selected by the user.

Next, the operation performed when the user selects the composite image capture mode in step S104 will be described.

When the composite image capture mode is set, sample composite images can be displayed in place of the sample moving images described above.

Figure 5:
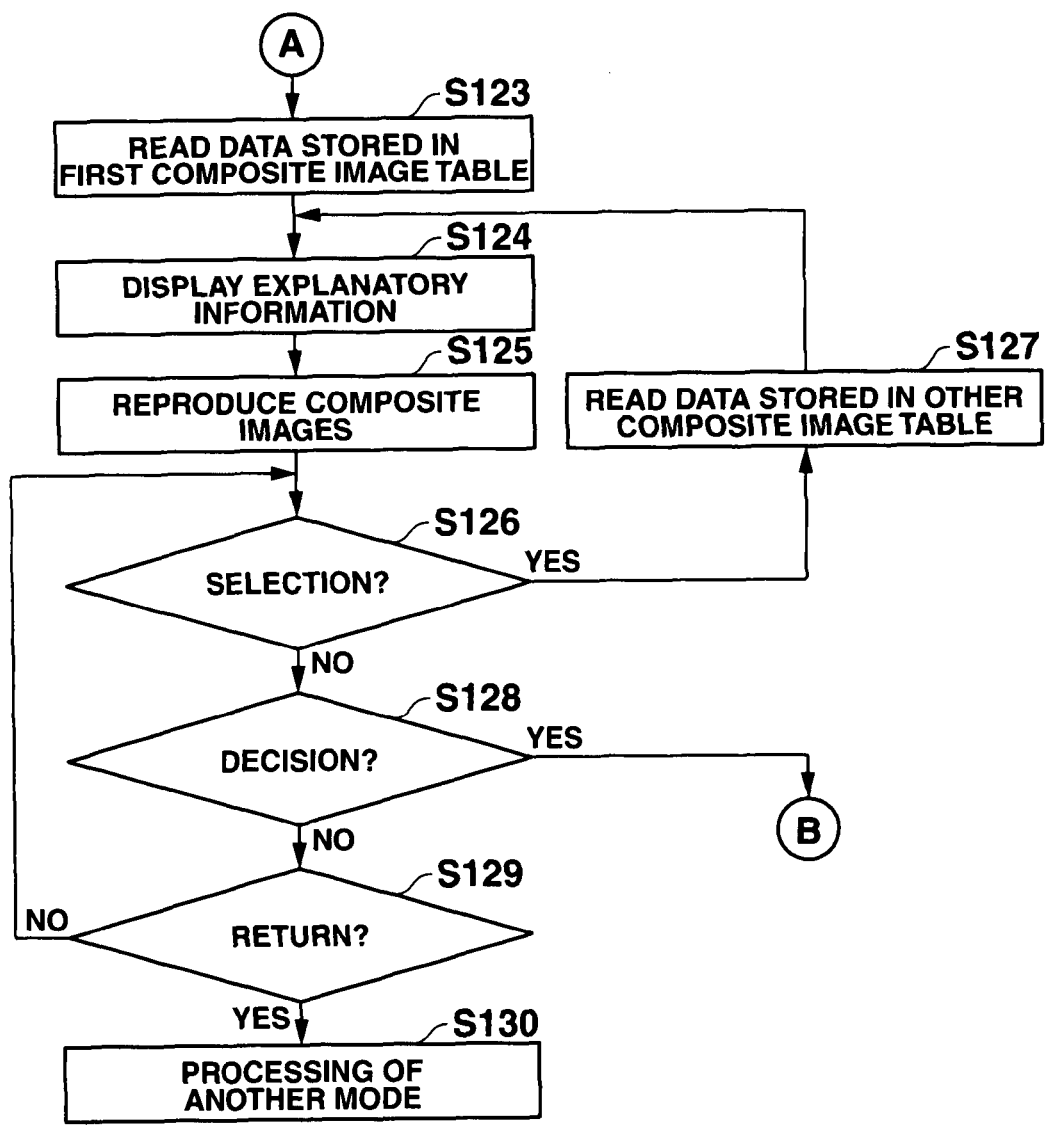
FIG. 5 is a flowchart continuous with the flowchart of FIG. 4.

More specifically, when the CPU 13 determines that the composite image capture mode is set in the above step S104, the CPU 13 executes the processing of step S123 in FIG. 5. That is, the CPU 13 reads a first composite image table corresponding to high-speed image capture from the flash memory 26 (step S123). The flash memory 26 stores first to M-th composite image tables (not shown in the drawings).

Each of the composite image tables stores, as substitutes for the sample moving images A, B and C, composite images PA, PB and PC, which are generated from captured image data of objects which differ in moving speed (such as a walking person, a traveling automobile and a falling object) and are captured at the same image capture frame rate.

Figure 7:
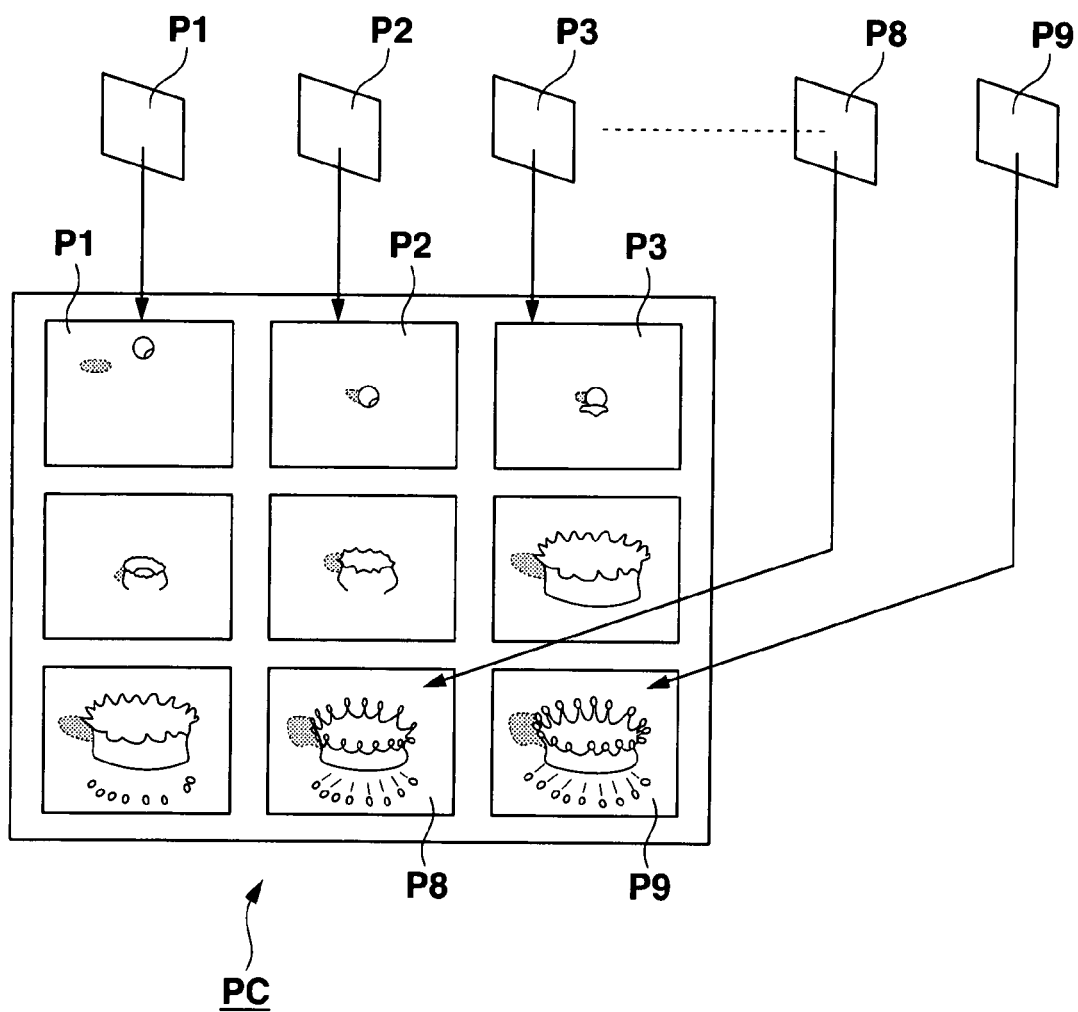
FIG. 7 is a diagram showing an example of composite image generation.

The first composite image table stores sample composite images PA, PB, PC of a walking person, a traveling automobile and a falling object, respectively, in place of the sample moving images A, B and C stored in the first moving image table illustrated in FIG. 2. An example of the sample composite image PC is shown in FIG. 7. The composite image table does not store the reproduction frame rate but rather is associated with composite image generation conditions.

The sample composite images PA, PB and PC stored in the first composite image table are generated as follows. Image data is obtained in such a manner that the respective objects moving at different speed are captured at a high image capture frame rate (e.g., 360 fps). Predetermined frames of image data, nine frames (P1 to P9) in the present embodiment, are extracted at even intervals from the obtained image data of each object. A composite image such as PC shown in FIG. 7 is generated from the extracted image data. The composite image data is stored in the first composite image table as the sample composite images PA, PB and PC. In addition, the aforementioned high-speed image capture frame rate is also stored in the first composite image table.

Furthermore, second and third composite image tables also store sample composite images PA, PB and PC generated in a similar manner to the sample composite image PC shown in FIG. 7. The second composite image table corresponds to medium-speed image capture. The second composite image table stores sample composite images PA, PB, and PC generated from image data captured at a lower image capture frame rate (e.g., 240 fps) than the sample composite images PA, PB and PC stored in the first composite image table. Further, the third composite image table corresponds to low-speed image capture. The third composite image table stores sample composite images PA, PB, and PC generated from image data captured at a lower image capture frame rate (e.g., 120 fps) than the sample composite images PA, PB and PC stored in the second composite image table. The second and third composite image tables also store the corresponding image capture frame rates.

Figure 8:
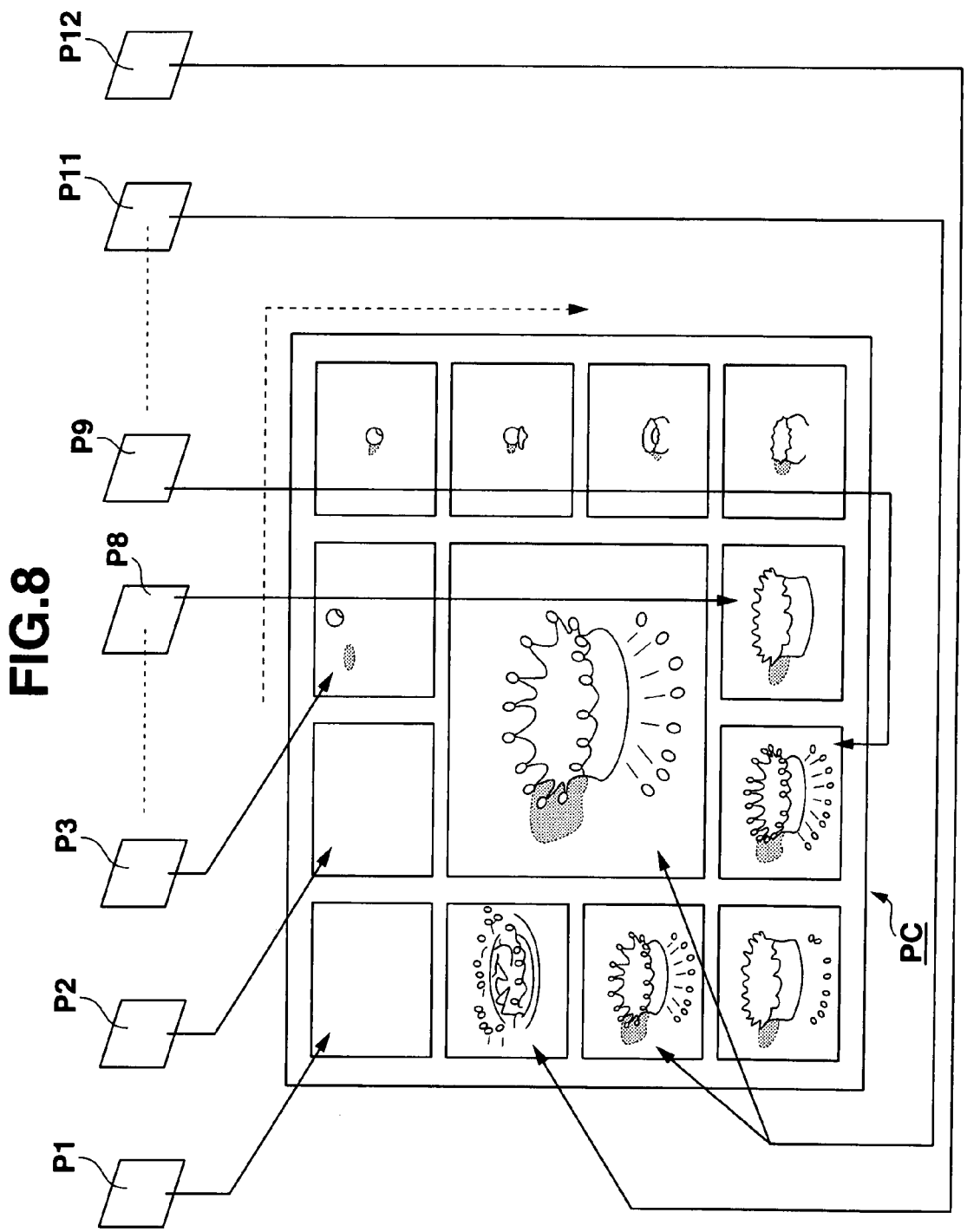
FIG. 8 is a diagram showing another example of the composite image generation.
Figure 9:
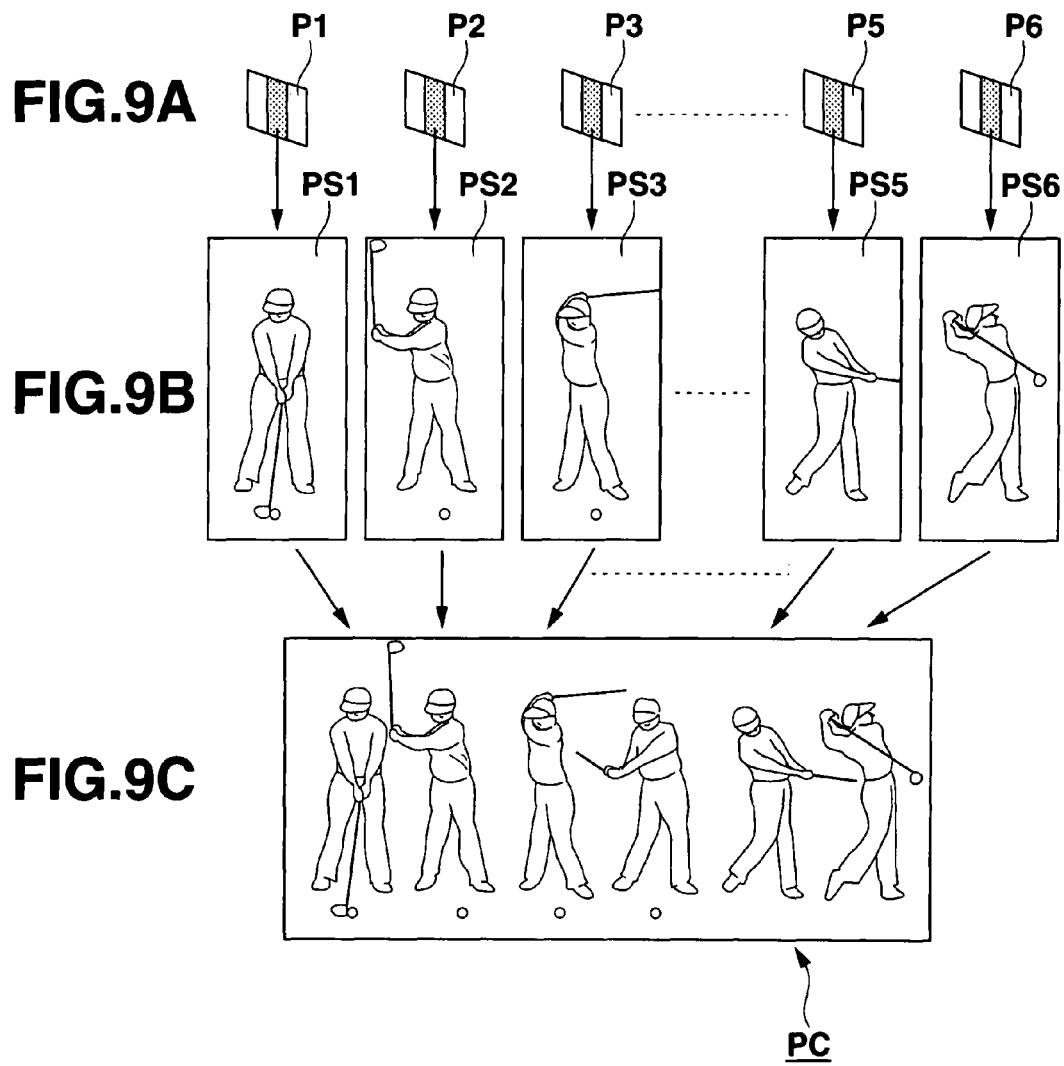
FIGS. 9A, 9B, and 9C are diagrams showing a further example of the composite image generation.

Moreover, a fourth composite image table stores sample composite images PA, PB and PC. The image arrangement of the sample composite images stored in the fourth composite image table is different from the image arrangement of the sample composite images stored in the first to third sample composite image tables. An example of the sample composite image PC in the fourth composite image table is shown in FIG. 8. In the example shown in FIG. 8, twelve predetermined frames of image data (P1 to P12) are extracted at even intervals from the obtained image data of the object and the composite image is formed by arranging the extracted frames of image data as shown in FIG. 8. The sample composite images PA, and PB are generated in the same manner as the sample composite image PC. The composite images PA, PB and PC are generated from image data of objects having different moving speeds. The objects are captured at a high image capture frame rate (360 fps, for example).

Thus, sample composite images corresponding to various image capture frame rates and various image arrangements (not limited to the image capture frame rates and image arrangements described above and shown in FIGS. 7 and 8) are stored together with the corresponding image capture frame rates in the first to M-th composite image tables.

After reading the first composite image table corresponding to high-speed image capture from the flash memory 26 in step S123, the CPU 13 displays the explanatory information read from the first composite image table in the explanation display area 234 (step S124); accordingly, the explanatory information "High speed image capture will be performed, it is suitable for shooting a falling object or golf swing." appears in the explanation display area 234.

Subsequently, the CPU 13 simultaneously displays the sample composite images PA, PB and PC stored in the first composite image table in the first to third image display areas 231 to 233 (step S125). By the processing of step S125, the CPU 13 displays a composite image PA of a walking person in the first image display area 231, a composite image PB of a traveling automobile in the second image display area 232, and a composite image PC of a falling object in the third image display area 233. In other words, the first image display area 231 displays a composite image PA of an object moving at lower speed than objects displayed in other image display areas 232 and 233. The third image display area 233 displays a composite image PC of an object moving at higher speed than objects displayed in other image display areas 231 and 232. The second image display area 232 displays a composite image PB of an object moving at medium speed (between the speeds of the objects displayed in the image display areas 231 and 233).

The composite images PA, PB and PC are composite images obtained from captured image data of objects moving at different speeds. The composite image PA is a composite image of a walking person formed by composition of captured image data of an object moving at slow speed. The composite image PB is a composite image of a traveling automobile formed by composition of captured image data of an object moving at medium speed. The composite image PC is a composite image of a falling object formed by composition of captured image data of an object moving at high speed. The user can recognize what composite images are generated from image data of objects moving at different speeds and captured at high speed. By considering the moving speed of a desired object, the user may readily determine whether or not it is appropriate to shoot the desired object at the same frame rate as the displayed composite images. Namely, the user can compare arrangements of objects in composite images which are simultaneously displayed. The user can easily determine whether or not it is appropriate to shoot the desired object at the same frame rate as the composite images being displayed. In addition, the user can readily determine whether or not it is preferable to generate a composite image from captured image data of the desired object in the same manner (the same image arrangement) as the composite images being displayed.

As explained above, though an object may be moving at one (same) speed, the moving speed in the display screen (expressed by dot/s) varies depending on zoom ratios for image capture and relative distances between the digital camera and the moving objects. However, the user can intuitively understand the relationship between the frame rate and the angle of view or composition by viewing the sample composite images PA, PB and PC.

Furthermore, by referring to the displayed explanatory information, the user can readily determine whether or not it is appropriate to shoot the desired object at the same frame rate as the displayed composite images. Namely, the user can readily determine whether or not the desired object will suitably be arranged within the composite image, when the composite image is generated based on the captured image data of the desired object.

When the user takes the moving speed of the desired object into consideration and determines that it is not appropriate to capture images at the same frame rate as the displayed composite images, or determines that it is not appropriate to generate a composite image in the same manner as the displayed composite images, the user may enter a "selection" instruction by operating the minus key or the plus key of the key input unit 27. The CPU 13 determines whether or not the "selection" instruction is detected (step S126). When the CPU 13 determines that the "selection" instruction is detected ("YES" in step S126), the CPU 13 reads stored data from another composite image table (step S127). Then, the CPU 13 repeats the processing of step S124 and thereafter.

When the second composite image table is retrieved in step S127, as shown with respect to the second moving image table in FIG. 6C the explanatory information displayed in the explanation display area 234 is "Medium speed image capture will be performed, it is suitable for shooting a traveling automobile." In addition, the CPU 13 displays the sample composite image PA of a walking person in the first image display area 231, the composite image PB of a traveling automobile in the second image display area 232 and the composite image PC of a falling object in the third image display area 233 by the processing in step S125.

As described above, the composite images PA, PB and PC respectively correspond to objects moving at different speeds. The user may view the composite images PA, PB and PC generated with the same image arrangement from image data of objects moving at different speeds and captured at same frame rate. By considering the moving speed of a desired object and the displayed explanatory information, the user can determine whether or not it is appropriate to shoot the desired object at the same frame rate as the displayed composite images. Namely, the user can readily determine whether or not the desired object will suitably be arranged within the composite image, when the composite image is generated from the captured image data of the desired object.

According to the present embodiment, by comparing the display screen switched based on the composite image tables, the user can clearly understand how the composite image will be generated based on the captured image data.

On the other hand, when the CPU 13 determines in step S126 that the "selection" instruction is not detected, the CPU 13 determines whether or not "decision" is instructed by depression of the shutter key (step S128). When the CPU 13 determines that "decision" is not instructed ("NO" in step S128), the CPU 13 determines whether or not "return" is instructed by operation of the menu key (step S129). When the CPU 13 determines that "return" is not instructed ("NO" in step S129), the CPU 13 repeats the processing of step S126 and thereafter. When the CPU 13 determines that the "return" instruction is made ("YES" in step S129), the CPU 13 executes a processing of another mode (step S130).

After comparing the moving speed of the desired object with the displayed composite images PA to PC, when the user determines that it is appropriate to shoot the desired object at the same image capture frame rate as the displayed composite images, the user presses the shutter key down to instruct "decision" ("YES" in step S128). Consequently, the CPU 13 executes the processing of the step S113 in FIG. 4 (described above).

The processing from step S113 to S119 is the same in the composite image capture mode as in the movie capture mode described above. That is, the CPU 13 reads out data including the image capture conditions stored in the composite image table corresponding to the composite images being displayed at the time when the "decision" instruction is made. The CPU 13 configures setting values of components of the digital camera 10 on the basis of the read-out data (step S113). Thereafter, the CPU 13 starts display processing of a through image at the standard frame rate (e.g., 60 fps) (step S114). When the user operates the shutter key for the first time to start image capture ("YES" in step S115), the CPU 13 changes the image capture frame rate of the CCD 18 to the image capture frame rate configured in step S113 (step S116). The CPU 13 sequentially stores the image data output at the frame rate changed in step S116 in the SDRAM 22 (step S117). When the user operates the shutter key for the second time to terminate image capture ("YES" in step S118), the CPU 13 determines which of the movie capture mode and the composite image capture mode was set by the user in step S104 (step S119).

When the composite image capture mode is set, the CPU 13 generates a composite image by use of a predetermined number of frames of image data stored in the SDRAM 22 (step S121). FIGS. 7 to 10 are diagrams showing examples of composite images generated in step S121. The CPU 13 generates a composite image having the same arrangement as the composed images displayed at the time when the "decision" instruction is made.

The composite image PC illustrated in FIG. 7 is generated as follows. Predetermined frames P1, P2, P3, . . . , P9 are extracted at even intervals from the captured image data stored sequentially in the SDRAM 22. The extracted frames are sequentially arranged in the horizontal and vertical directions (i.e., so that the first frame is at the top left, and the last frame is at the bottom right).

The composite image PC illustrated in FIG. 8 is generated as follows. Predetermined frames P1, P2, P3, . . . , P12 are extracted at even intervals from the captured image data stored sequentially in the SDRAM 22 and are arranged around a specific representative image, P11 for example, in a time series, in a clockwise direction for example.

FIG. 9C shows another example of a composite image (composite image PC is used as an example in FIG. 9C). The composite image PC indicated in FIG. 9C is generated in the following manner. First, as indicated in FIG. 9A, predetermined frames P1, P2, P3, . . . , P6 are extracted at even intervals from the captured image data stored sequentially in the SDRAM 22. The central region of each of the extracted frames P1, P2, P3, P6 is clipped out, to generate clipped images PS1, PS2, PS3, . . . , PS6 as shown in FIG. 9B. The clipped images PS1, PS2, PS3, . . . , PS6 are sequentially arranged in the horizontal direction to generate the composite image PC of a golf swing, as shown in FIG. 9C.

Figure 10:
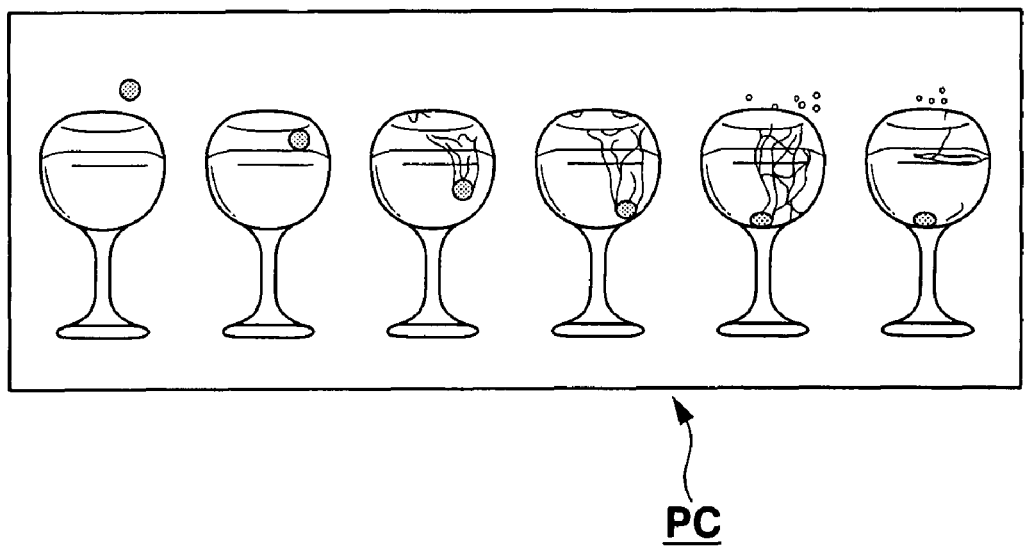
FIG. 10 is a diagram showing still another example of the composite image generation.

The composite image PC shown in FIG. 10 is generated in the same manner as the composite image PC shown in FIG. 9C. That is, the predetermined frames are extracted; the central regions of the extracted frames are clipped out; and the clipped regions are sequentially arranged to generate the composite image.

When the composite image is generated, the CPU 13 stores the generated composite image in the external memory 25 in step S122 and terminates the processing.

After performing the "decision" operation, the user merely operates the shutter key to instruct the start and termination of capturing a moving image; therefore, capturing a moving image at a suitable desired frame rate, generating a composite image in the desired manner based on the captured image data, and storing the generated composite image are easily performed.

According to the present embodiment, a composite image is generated by extracting predetermined frames from the captured image data, as described above. However, the image capture frame rate may be changed in step S116 so that only the predetermined frames are captured and stored in step S117. The memory capacity necessary for temporary storage of the captured image data can thereby be reduced.

In the present embodiment, in the moving image capture mode, the sample moving image data are captured at a higher frame rate than the reproduction frame rate (60 fps). Therefore, the sample moving images are reproduced in slow motion. However, the sample moving images may be captured at the same frame rate as the reproduction frame rate or at a lower frame rate than the reproduction frame rate. When the sample moving images are captured at a lower frame rate than the reproduction frame rate, the sample moving images are reproduced in "fast forward," instead of the slow motion reproduction described above.

In addition, when the display spaces of the first to third display areas 231 to 233 are too small to display clearly the sample composite images, only a single display area having a large display space may be provided, and the sample composite images A to C may be switched to be displayed in the single display area.

In the present embodiment, in response to the selection operation made by the user in step S104, one of the moving image capture mode and the composite image capture mode is selected. However, the user may select a mode in advance of step S104.

In the present embodiment, the first to third image display areas 231, 232 and 233 display the sample moving images A, B and C or the sample composite images PA, PB and PC. Instead, only a single image display area may be provided on the screen. A sample moving image or a sample composite image may be displayed in the single image display area, and the user may switch the displayed sample image by entering the "selection" instruction.

Second Embodiment

FIG. 11 is a diagram showing a moving image table 263 stored together with the aforementioned programs in the flash memory 26 according to the second embodiment. The moving image table 263 stores sample moving images. The moving image table 263 also stores "explanatory information," "image capture and reproduction conditions," and "other image capture conditions and correction conditions" corresponding to each of the sample moving images. According to the first embodiment, several items of sample moving image data are prepared for each image capture frame rate. In the first embodiment, plural sample moving images are prepared for one image capture frame rate; however, a single sample moving image is prepared for a single image capture frame rate in the second embodiment.

According to the second embodiment, sample moving images A, B and C of the same scene having the same object (e.g., a walking person) are captured at different image capture frame rates.

The sample moving image A is an image of a walking person captured at a high frame rate of 360 fps. As explanatory information corresponding to the sample moving image A, text data such as "High speed image capture will be performed, it is suitable for shooting a falling object or golf swing." is stored.

The sample moving image B is an image of the same object as the sample moving image A (the walking person) captured at a medium frame rate of 240 fps. As the explanatory information corresponding to the sample moving image B, text data such as "Medium speed image capture will be performed, it is suitable for shooting a traveling automobile." is stored.

The sample moving image C is an image of the same object as the sample moving images A and B (the walking person) captured at a low frame rate of 120 fps. As the explanatory information corresponding to the sample moving image C, text data such as "Low speed image capture will be performed, it is suitable for shooting a walking person" is stored.

Data about an image capture frame rate (fps), an image reproduction frame rate (fps) and an image size is stored as "image capture and reproduction conditions". Setting data about a flash, white balance, an ISO speed and a photometric method, an AF area, a filter, color enhancement, color saturation, sharpness and the like is stored as "other image capture conditions and correction conditions."

The sample moving images A to C stored in the moving image table 263 are moving images of the same scene captured at different image capture frame rates, as explained above. Thus, 360 fps is stored as an image capture frame rate corresponding to the sample moving image A; 240 fps is stored as an image capture frame rate corresponding to the sample moving image B; and 120 fps is stored as an image capture frame rate corresponding to the sample moving image C.

Figure 12:
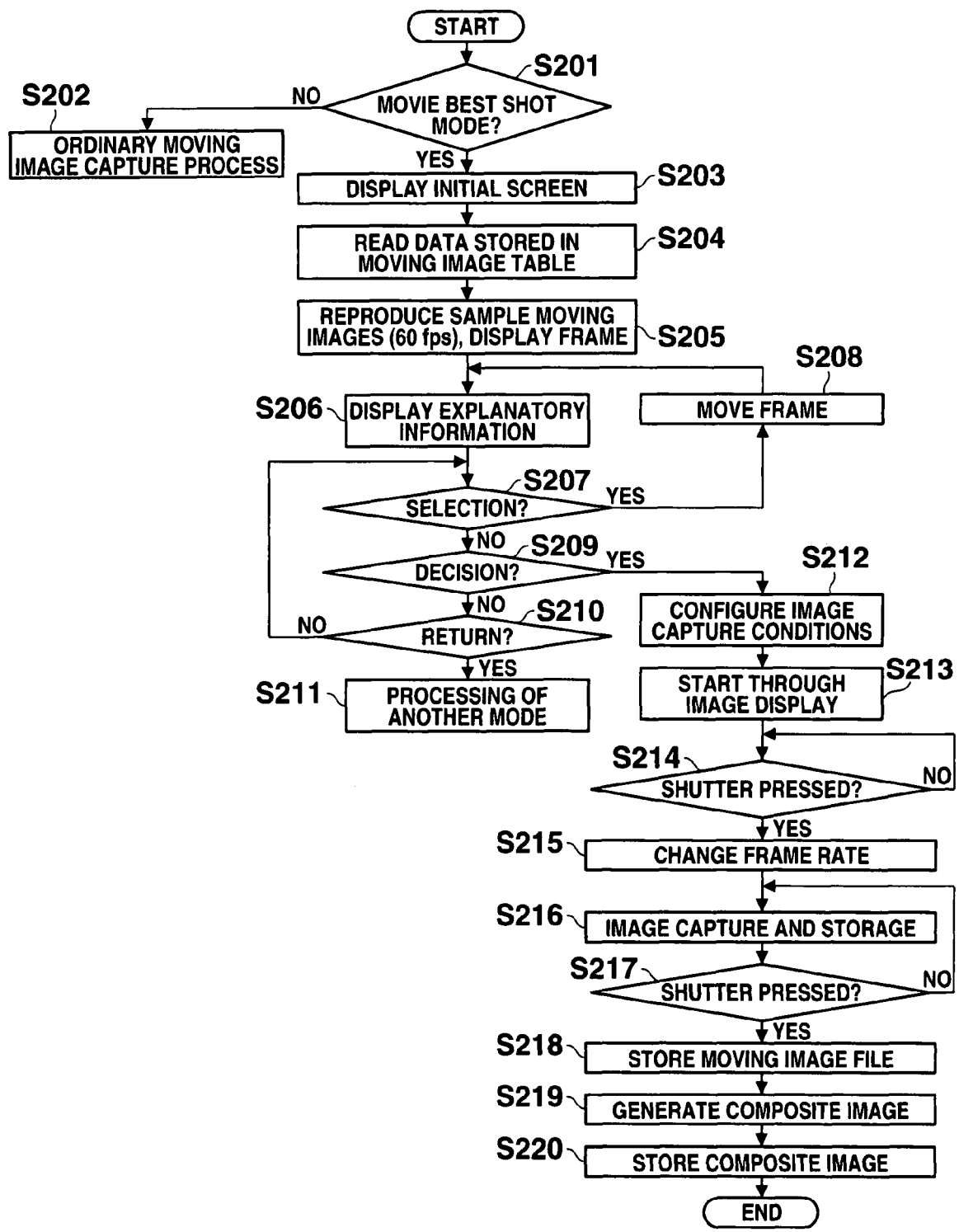
FIG. 12 is a flowchart of a process according to the second embodiment.

In the present embodiment according to the above configuration, when a user sets the moving image capture mode, the CPU 13 executes processing indicated in the flowchart of FIG. 12, based on a program stored in the flash memory 26. Firstly, the CPU 13 determines whether or not a movie-best-shot mode is set by the user through the key input unit 27 (step S201). When the CPU 13 determines that the movie-best-shot mode is not set ("NO" in step S201), the flow proceeds to ordinary moving image capture processing (step S202).

When the CPU 13 determines that the movie-best-shot mode is set by the user ("YES" in step S201), the CPU 13 displays an initial screen on the LCD monitor 23 as shown in FIG. 6A (step S203). As illustrated in FIG. 6A, the initial screen includes the first to third image display areas 231 to 233, the explanation display area 234, and button indicators 235 to 237 for "selection", "decision" and "return".

The CPU 13 reads the data stored in the moving image table 263 from the flash memory 26 (step S204). The CPU 13 simultaneously reproduces read-out sample moving images A, B and C stored in the moving image table 263 in the first to third image display areas 231 to 233. In addition, the CPU 13 displays a frame 238 surrounding the first image display area 231 (step S205).

Figure 13A:
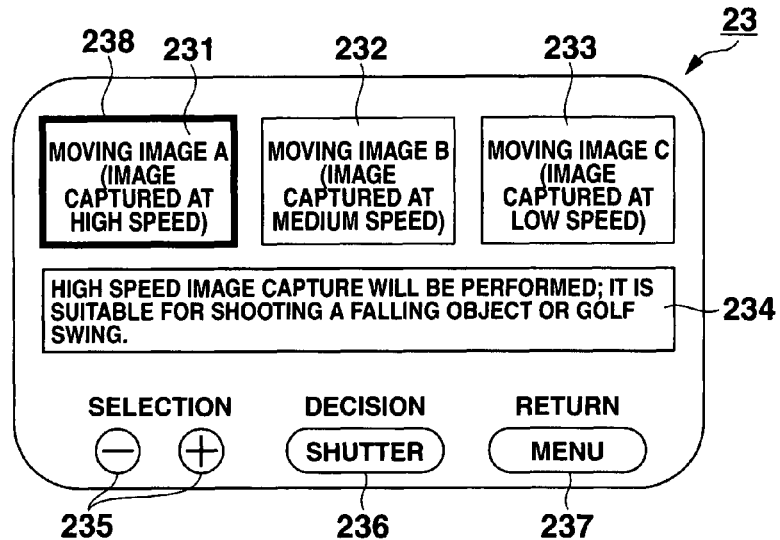
FIGS. 13A and 13B are diagrams showing display transition according to the second embodiment.

More specifically, as a result of the processing of step S205, the CPU 13 displays the sample moving image A, a moving image of a walking person captured at a high image capture frame rate of 360 fps, in the first image display area 231 with a frame 238 surrounding the first image display area 231 as illustrated in FIG. 13A. The CPU 13 displays the sample moving image B, a moving image of the walking person captured at a medium image capture frame rate of 240 fps, in the second image display area 232. The CPU 13 displays the sample moving image C, a moving image of the walking person captured at a low image capture frame rate of 120 fps, in the third image display area 233.

The sample moving images A, B and C correspond to the same reproduction frame rate of 60 fps, which is stored in the moving image table 263. On the other hand, as explained above the image capture frame rates of the sample moving images A, B and C are different from each other (360 fps, 240 fps and 120 fps, respectively). Therefore, the sample moving image A is reproduced in slow motion at one-sixth speed; the sample moving image B is reproduced in slow motion at one-fourth speed; and the sample moving image C is reproduced in slow motion at half speed. Therefore, the user can clearly recognize the differences in the sample moving images of the same object captured at different image capture frame rates and reproduced at the same reproduction frame rate. In other words, the user can clearly recognize, in one display screen, how a captured moving image will be reproduced.

The CPU 13 displays the explanatory information corresponding to the sample moving image surrounded by the frame 238 in the explanation display area 234 (step S206). When the frame 238 surrounds the first image display area 231 (sample moving image A) as shown in FIG. 13A, the explanation display area 234 shows the explanatory information corresponding to the sample moving image A, i.e., "High speed image capture will be performed, it is suitable for shooting a falling object or golf swing."

When the user determines that it is not appropriate to capture the object at the same frame rate as the sample moving image surrounded by the frame 238 in view of moving speed of the desired object, the user may enter a "selection" instruction by operating the minus key or the plus key of the key input unit 27. The CPU 13 determines whether or not "selection" instruction is detected (step S207). When the CPU 13 determines that the "selection" instruction is detected ("YES" in step S207), the frame 238 moves to surround another image display area (step S208).

In response to operation of the plus key by the user, the frame 238 moves to surround the image display area to the right, and in response to operation of the minus key by the user, the frame 238 moves to surround the image display area to the left. When the frame 238 surrounds the first image display area 231 and the user operates the plus key, the frame 238 moves to surround the second image display area 232. When the frame 238 surrounds the second image display area 232 and the user operates the plus key, the frame 238 moves to surround the third image display area 233. When the frame 238 surrounds the third image display area 233 and the user operates the plus key, the frame 238 moves to surround the first image display area 231. When the user operates the minus key, the frame 238 moves in the direction opposite to the direction in which the frame 238 moves when the user operates the plus key.

After the frame 238 is moved in accordance with the "selection" instruction, the CPU 13 repeats the processing of step S206 and thereafter with respect to the image display area currently surrounded by the frame.

Figure 13B:
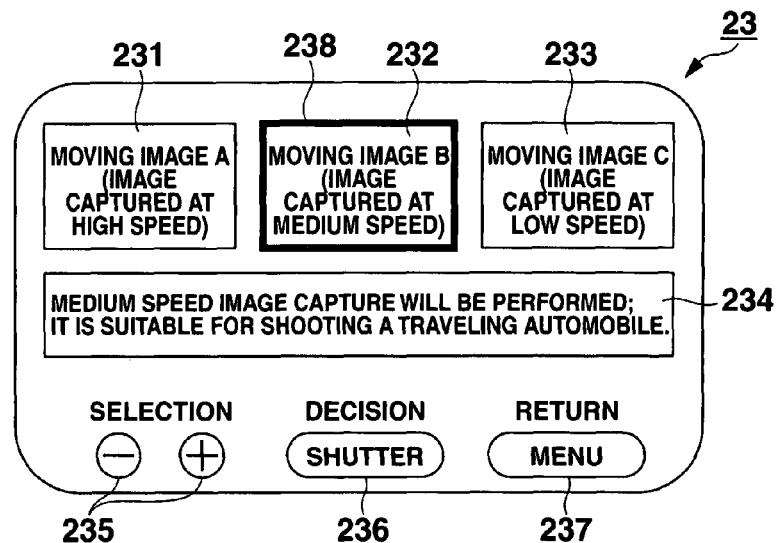

Hence, when the frame 238 moves to frame the second image display area 232 (sample moving image B) in step S208 as illustrated in FIG. 13B, the explanation display area 234 shows, in step S206, the explanatory information corresponding to the sample moving image B, i.e., "Medium speed image capture will be performed, it is suitable for shooting a traveling automobile."

When the CPU 13 determines that the "selection" instruction is not detected ("NO" in step S207), the CPU 13 determines whether or not "decision" is instructed by depression of the shutter key (step S209). When the CPU 13 determines that "decision" is not instructed, the CPU 13 determines whether or not "return" is instructed by operation of the menu key (step S210). When the CPU 13 determines that "return" is not instructed ("NO" in step S210), the CPU 13 repeats processing of step S207 and thereafter. When the CPU 13 determines that "return" is instructed ("YES" in step S210), the flow proceeds to another mode (step S211).

After comparing the moving speed of the desired object with the reproduced sample moving images A to C, when the user determines that it is appropriate to shoot the desired object at the same image capture frame rate as the sample moving image surrounded by the frame 238, the user presses the shutter key down to instruct "decision". The determination result of step S209 thereby becomes "YES", and the flow proceeds to step S212 to configure image capture conditions.

More specifically, the CPU 13 retrieves the "image capture conditions" and the "other image capture conditions and correction conditions" corresponding to the sample moving image being surrounded by the frame 238 at the time when the "decision" instruction is made, from the moving image table 263. The CPU 13 configures and controls the corresponding components of the digital camera 10 based on the retrieved image capture conditions and the like (step S212).

Then, the CPU 13 starts display of a through image (step S213). The CPU 13 causes the CCD 18 to output image data at a predetermined standard frame rate (60 fps, for example), and displays the through image on the LCD monitor 23 on the basis of the output image data (step S214). The CPU 13 waits for the first press of the shutter key (step S214). When the first press of the shutter key is performed ("YES" in step S214), the CPU 13 changes the image capture frame rate of the CCD 18 from the aforementioned standard frame rate to the image capture frame rate configured in step S212 (step S215).

The image capture frame rate of the sample moving image B is 240 fps, for instance. Therefore, when "decision" is instructed when the frame 238 surrounds the sample moving image B as indicated in FIG. 13B, the CPU 13 changes the image capture frame rate from the standard image capture frame rate of 60 fps to the image capture frame rate of 240 fps. The image data is output from the CCD 18 at the frame rate of 240 fps. The CPU 13 sequentially stores the image data output at the image capture frame rate changed in step S215 into the SDRAM 22 (step S216).

In the present embodiment, after displaying the image data output at the standard frame rate as the through image, the CPU 13 changes the image capture frame rate in response to the press of the shutter key. However, the CPU 13 may capture the through image at the image capture frame rate configured in step S212, instead of waiting for the press of the shutter key to change frame rate.

The CPU 13 determines whether or not the second press of the shutter key is performed (step S217). The CPU 13 repeats the processing of step S216 until the second press of the shutter key is performed ("YES" in step S217). In the case in which the image capture frame rate is set to 240 fps, the CPU 13 sequentially stores frames of image data captured at 240 fps in the SDRAM 22.

When the user presses the shutter key down for the second time to terminate capturing of the moving image, the determination result in step S217 becomes "YES". The flow proceeds to step S218, where the CPU 13 generates a moving image file from the frames of image data stored in the SDRAM 22 and names the file to store the named file in the external memory 25 (step S218). The CPU 13 may add the reproduction frame rate, which is stored as the "reproduction condition" in the moving image table 263, to the moving image file as header information, as described in the first embodiment. Hence, at the time of reproducing the moving image file, it is possible to reproduce the moving image file at the same reproduction frame rate as the sample moving image which is selected by the user.

Thereafter, the CPU 13 creates a composite image from the frames of image data stored in the SDRAM 22 (step S219) in the manner described above with respect to FIGS. 7 to 10. The CPU 13 may generate a composite image based on a predetermined image arrangement. However, the user may arbitrarily select an image arrangement (composition form) in step S207. Then, the CPU 13 stores the generated composite image in the external memory 25 (step S220), and terminates the processing.

In the present embodiment, the sample moving image data captured at a higher frame rate than the reproduction frame rate (60 fps) is stored in the moving image table 263. However, moving images captured at the same frame rate as the reproduction frame rate or captured at a lower frame rate than the reproduction frame rate may be stored as sample moving images.

Furthermore, in the present embodiment, the sample moving images A, B and C are stored in the moving image table 263, as indicated in FIG. 11. However, instead of the moving images A, B and C, the moving image table may store sample composite images generated from image data of the same object captured at different image capture frame rates and having one (or more) of the image arrangements shown by PC in FIGS. 7 to 10. If the composite images are stored as sample composite images, the sample composite images are displayed in step S205 of FIG. 12 instead of reproducing the sample moving images.

When the display spaces of the first to third display areas 231 to 233 are too small to display clearly the sample composite images, only a single display area having a large display space may be provided. The sample composite images A to C may be switched to be displayed in the single display area.

The main object of the sample moving images and the sample composite images is a walking person in the explanation of the present embodiment. However, several different main objects (sample objects) of the sample moving images and the sample composite images may be prepared beforehand so that the user can choose any of the sample objects. For instance, objects of different moving speed may be prepared in advance, such as a walking person, a traveling automobile and a falling object. The user can arbitrarily choose one of the sample objects in accordance with the object which the user intends to shoot. The user can understand how the intended object will be reproduced by means of viewing more suitable sample objects. Furthermore, the setting data of "other image capture conditions and correction conditions" may be set for each selectable sample object. For instance, when the sample object is a walking person, it is preferable that "other image capture conditions and correction conditions" include conditions for executing processing suitable for shooting a person such as skin tone enhancement and a low-contrast filter. When the sample object is a traveling automobile, a target of the image capture is an artificial object. In such a case, it is preferable that "other image capture conditions and correction conditions" include conditions for performing processing suitable for shooting an artificial object such as edge enhancement.

For creating a composite image, different composite forms (image arrangements) may respectably correspond to the sample composite images.

Other Embodiments

As described in the above embodiments, when the user selects a reproduced sample moving image and enters the "decision" instruction for settling the selection, the CPU 13 sets an image capture frame rate corresponding to the decided sample moving image. The digital camera 10 thereby conducts capturing of a moving image at a high frame rate such as 360 fps and 240 fps. However, there is an ability limit of the digital camera 10 such as a limit of processing capacity of the CPU 13. In the case where moving image capture is performed at a high frame rate, when the user attempts to process or transmit frames of the image data at a high frame rate, the ability limit of the digital camera 10 may oppose the processing. In such a case, employing the following techniques is preferable.

(1) Trimming

Figure 14:
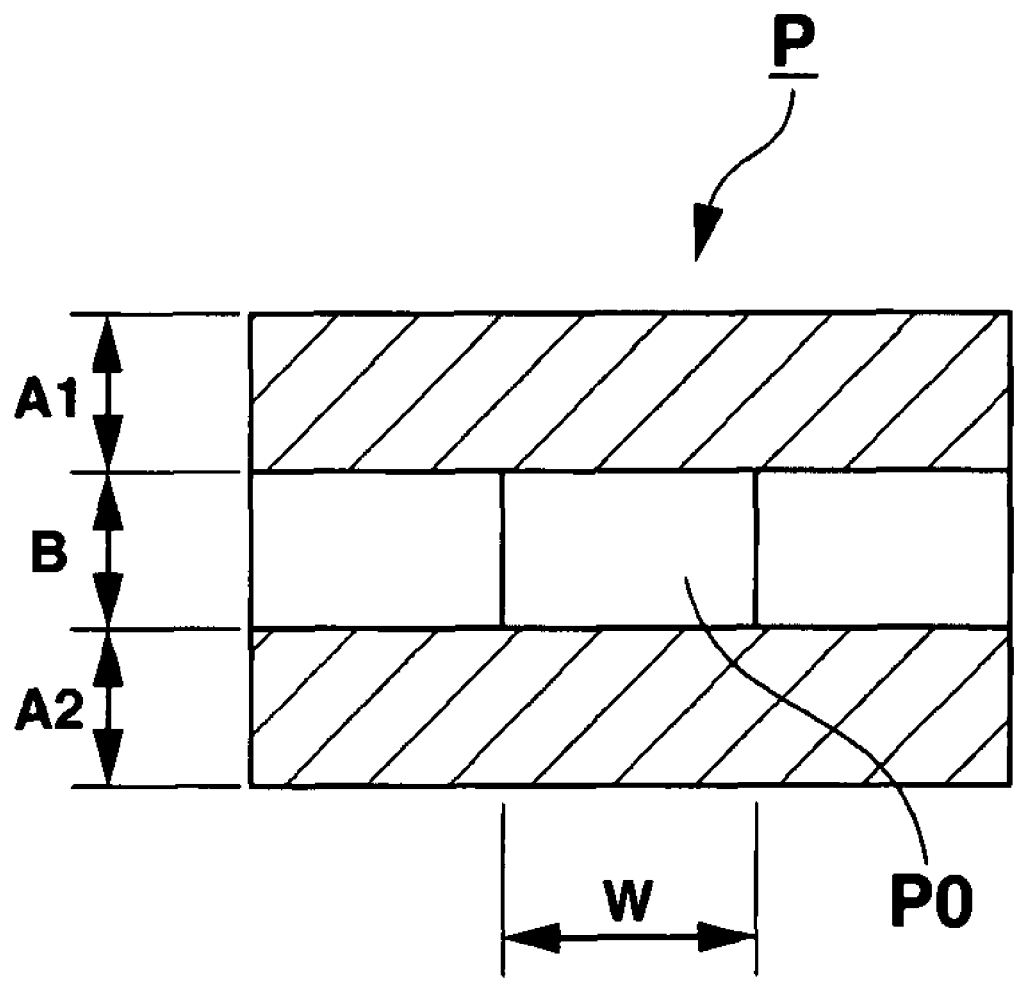
FIG. 14 is an explanatory diagram for an overview of trimming processing.

As illustrated in FIG. 14, the upper horizontally long portion A1 and the lower horizontally long portion A2 are trimmed off (trimming) from an image frame P so that the center portion B remains. Side portions are cut off from the center portion B depending on the aspect ratio of the frame P. As a result, a reduced frame P0 is generated, which is smaller than the original frame P but has the same aspect ratio as the original frame P. The size of the reduced frame P0 in FIG. 14 is one-ninth compared with the original frame P. The processing speed thereby becomes nine times as fast as in the case in which the original frame P is processed. The trouble caused in processing or transmitting frames of image data can be prevented from occurring.

(2) Pixel Addition

Figure 15:
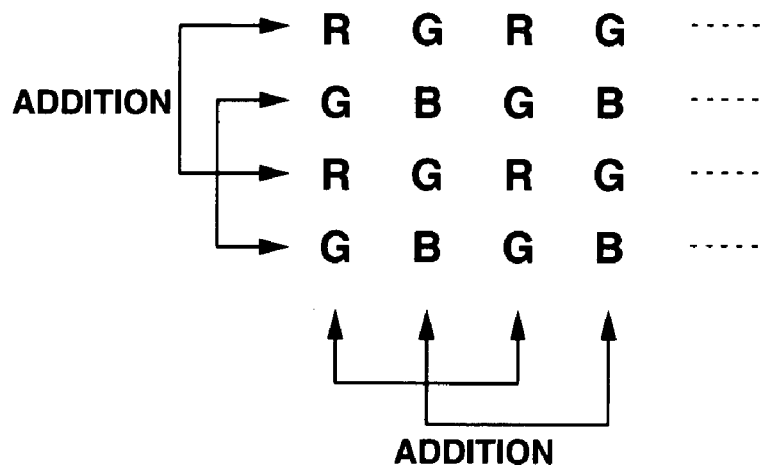
FIG. 15 is an explanatory diagram for an overview of pixel addition processing.

As indicated in FIG. 15, two pixels in the vertical direction and two pixels in the horizontal direction are added together. After the pixel addition, the size of the frame is reduced to a quarter of the original frame. The processing speed thereby becomes four times as fast as in the case in which the original frame is processed. The trouble caused in processing or transmitting frames of image data can be prevented from occurring.

(3) Pixel Skipping

Figure 16:
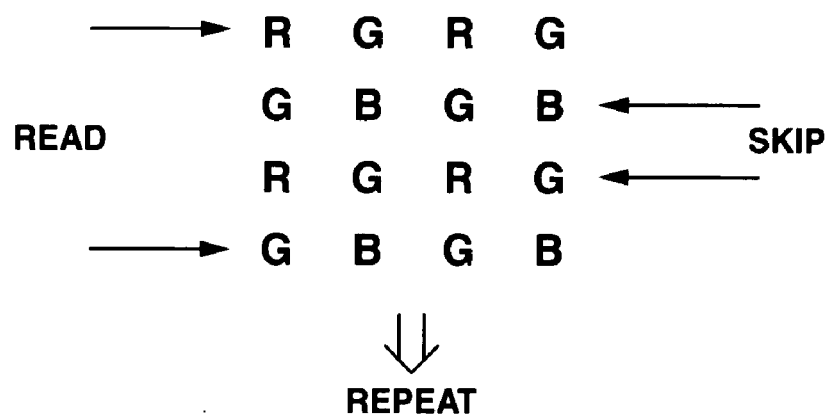
FIG. 16 is an explanatory diagram for an overview of pixel skipping processing.

As indicated in FIG. 16, RGB data of the second and third rows is skipped from four rows of RGB data. After the pixel skipping, the size of the frame is reduced to half of the original frame. The processing speed thereby becomes twice as fast as in the case in which the original frame is processed. The trouble caused in processing or transmitting frames of image data can be prevented from occurring.

In the above modification examples (1) to (3), degrees of trimming, pixel addition and pixel skipping may vary in accordance with the selected image capture frame rate. The size and in-plane resolution of the obtained image also vary in accordance with the image capture frame rate. Thereby, it is preferable to display a sample image having a size and an in-plane resolution corresponding to the image capture frame rate so that the user can still more easily understand the image to be obtained. Namely, display of a sample image is performed in such a manner that the user can readily compare differences of the image size or the in-plane resolution caused by the difference of the image capture frame rate.

In addition, the above explanation focuses on an example of moving image capture, but continuous shooting is performed in the similar way. The moving image in the above explanation can be replaced by continuous shooting.

What is claimed is:

1. An image capturing apparatus comprising:
an image capturing unit;
a first storage unit configured to store sample images, corresponding image capture frame rates, and corresponding reproduction frame rates;
a display unit configured to display the sample images stored in the first storage unit at one of: (i) a predetermined frame rate and (ii) the corresponding reproduction frame rates;
a detecting unit configured to detect a confirmation signal indicating an image capture frame rate corresponding to a sample image selected from the sample images;
a driving unit configured to drive the image capturing unit at the image capture frame rate indicated by the confirmation signal; and
a second storage unit configured to store image data captured by the image capturing unit;
wherein the display unit is configured to display the sample images in slow motion at the corresponding reproduction frame rates.

2. The image capturing apparatus according to claim 1, wherein the first storage unit stores the sample images of different objects.

3. The image capturing apparatus according to claim 1, wherein:
the first storage unit stores image groups, each of the image groups including sample images of different objects captured at a same image capture frame rate; and
the detecting unit detects the confirmation signal indicating an image capture frame rate corresponding to a selected one of the image groups.

4. The image capturing apparatus according to claim 1, wherein:
the first storage unit stores sample composite images indicative of corresponding arrangements; and
the detecting unit detects the confirmation signal indicating an image capture frame rate corresponding to a selected sample composite image.

5. The image capturing apparatus according to claim 4, further comprising a generation unit configured to generate a composite image from a plurality of items of image data captured by the image capturing unit, the composite image having an arrangement which corresponds to the selected sample composite image.

6. The image capturing apparatus according to claim 1, wherein:
the first storage unit stores explanatory information corresponding to the image capture frame rates of the sample images, and
the display unit displays the sample images with the corresponding explanatory information.

7. The image capturing apparatus according to claim 6, wherein:
the detecting unit detects a selection signal indicating one of the sample images before detecting the confirmation signal, and
the display unit displays explanatory information of the image capture frame rate corresponding to the one of the sample images which is indicated by the selection signal.

8. The image capturing apparatus according to claim 1, wherein the first storage unit stores information indicating image capture controlling contents in association with the image capture frame rates, and wherein the image capturing apparatus further comprises an image capture controlling unit configured to control the image capturing unit based on the information indicating the image capture controlling contents stored in the first storage unit.

9. An image capturing apparatus comprising:
an image capturing unit;
a first storage unit configured to store sample moving images, corresponding image capture frame rates, and corresponding reproduction frame rates;
a display unit configured to display the sample images stored in the first storage unit at one of (i) a predetermined frame rate and (ii) the corresponding reproduction frame rates;
a detecting unit configured to detect a confirmation signal indicating an image capture frame rate corresponding to a sample image selected from the sample images;
a driving unit configured to drive the image capturing unit at the image capture frame rate indicated by the confirmation signal; and
a second storage unit configured to store image data captured by the image capturing unit;
wherein the second storage unit stores a plurality of items of the image data captured by the image capturing unit as moving image data and stores a reproduction frame rate corresponding to the selected sample moving image.

10. A non-transitory computer readable storage medium having a program stored thereon for use with an image capturing apparatus including (i) an image capturing unit, (ii) a first storage unit configured to store sample images, corresponding image capture frame rates, and corresponding reproduction frame rates, and (iii) a second storage unit configured to store image data captured by the image capturing unit, the program controlling the image capturing apparatus to perform functions comprising:

displaying the sample images stored in the first storage unit at one of (i) a predetermined frame rate and (ii) the corresponding reproduction frame rates;

detecting a confirmation signal indicating an image capture frame rate corresponding to a sample image selected from the sample images; and driving the image capturing unit at the image capture frame rate indicated by the confirmation signal;

wherein the sample images are displayed in slow motion at the corresponding reproduction frame rates.

11. An image capturing method for an image capturing apparatus including (i) an image capturing unit, (ii) a first storage unit configured to store sample images, corresponding image capture frame rates, and corresponding reproduction frame rates, and (iii) a second storage unit configured to store image data captured by the image capturing unit, the method comprising:

displaying the sample images stored in the first storage unit at one of (i) a predetermined frame rate and (ii) the corresponding reproduction frame rates;

detecting a confirmation signal indicating an image capture frame rate corresponding to a sample image selected from the sample images; and driving the image capturing unit at the image capture frame rate indicated by the confirmation signal;

wherein the sample images are displayed in slow motion at the corresponding reproduction frame rates.

\* \* \* \* \*